[illegible] Reference [illegible]

[illegible]

[illegible] board, placed between [illegible] e.. and at the back of them

[illegible] the layer or batten — e. shuttle box.

[illegible] secured firmly to the end of shuttle box .. g.

[illegible] end is secured by a bended iron .. h.. on front of the layer —

[illegible] nut, for securing the shuttle box at one end, unto the layer —

[illegible] fastened by a screw .. j —

[illegible] side of shuttle box — with regulating screw .. l —

[illegible] blocks to play in .. as in other looms — n, .. wooden spring for throwing the shuttle .. — p [illegible] crescent or semicircle, pivoted on front of the breast beam

[illegible] between the top & bottom boards of which the breast beam is comp[illegible]

[illegible] or hand fastened on under side of crescent — and extending

[illegible] the layer — this hand has strings fastened to each of the

[illegible] blocks [illegible] to give the hand .. q .. the requisite force

[illegible] pivoted at each horn of the crescent .. p ..

[illegible] through the mortices .. t, t. and project beneath the

[illegible] the two hooks successively there are two treadles

[illegible] back of [illegible] frame . (of the first order) . connected by strings

[illegible] (of the second order) which are connected by

[illegible] treadles z, z ...... [illegible] batten, which prevents [illegible]

[illegible] for the hand .. q .. to move through

[illegible] the wooden spring .. n .. alternately

G. [illegible] yarn beam, with small divisions turned in it [illegible]

receive hoops of iron or [illegible] .. which are hinged together in [illegible]

or three pieces [illegible] so as to clasp round the yarn beam edgewise [illegible]

Fig. 6 — represents [illegible] for laying the leash .. in the different [illegible]

and [illegible] in which are placed wires [illegible]

threads suspended [illegible] with notches cut out to receive the ends of [illegible]

[illegible] pulley [illegible] the pulley which [illegible]

cloth beam [illegible] roller on yarn beam .. G .......... K, block and [illegible]

the band [illegible] roller, placed at the crossing of the band .. I

[illegible] temples [illegible]

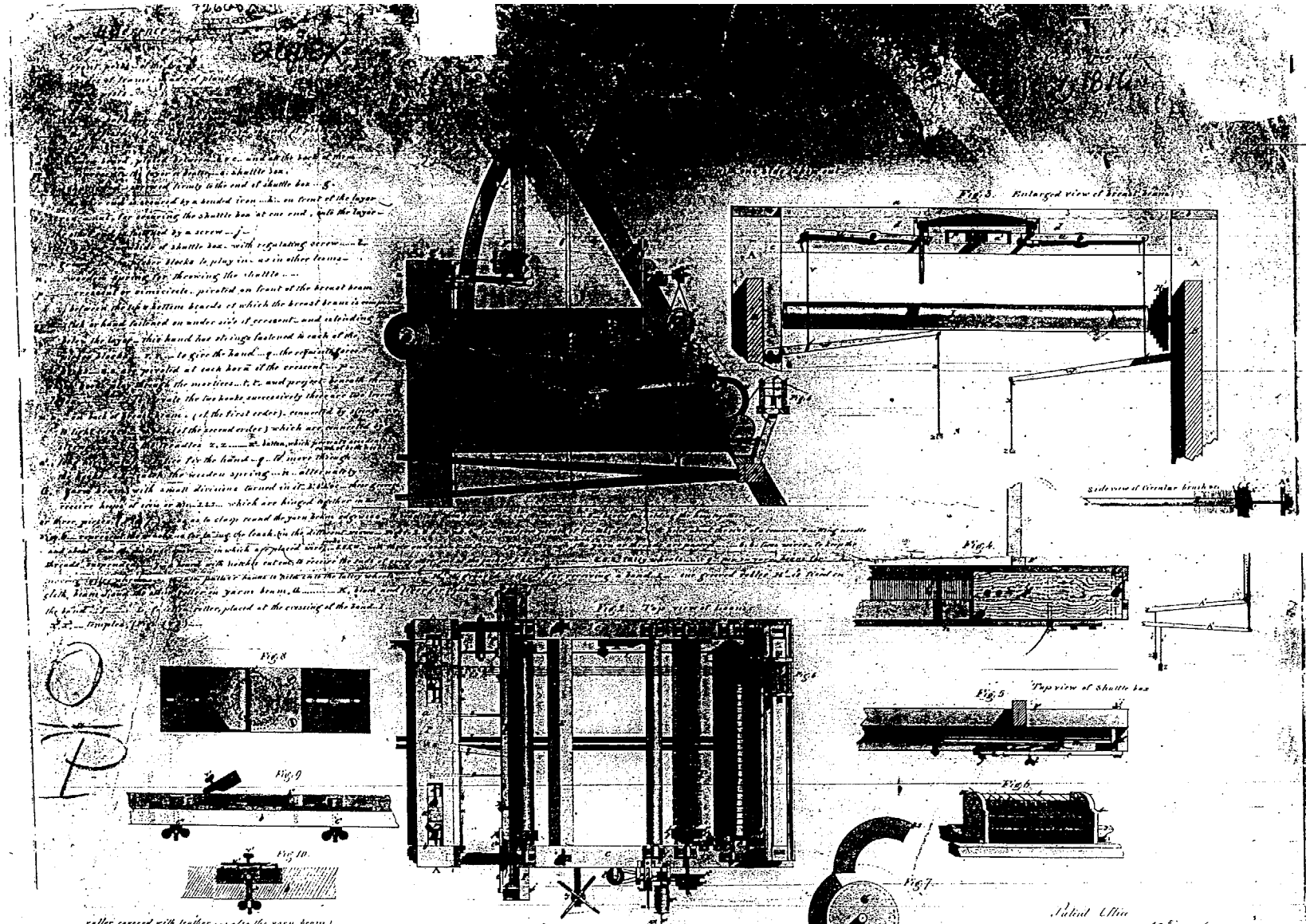

roller, covered with leather (as also the yarn beam)

which dips in the trough N... containing size or paste for sizing the yarn

[illegible] it passes the harness ..... P. circular brush, for brushing the web — which is turned by the motion of the treadles .. z. z. ......

[illegible] two whirls on end of shaft of circular brush .. P. having grooves in each — k. k. two clicks .. which catch in teeth [illegible] on shaft of circular brush.

and round which they are to revolve ....... [illegible] the treadles z. z. are two cross shafts .. [illegible] cords made fast to ends of cross shafts with a double turn round the whirl [illegible] these cross shafts are attached to the treadles by cords .. [illegible] one shaft to each treadle .....

Figs 8. 9. 10. views of temple ..... [illegible] ring of metal with sharp teeth on the flat of the ring, — [illegible] cap .... [illegible] two flat lips — [illegible] grooves —

[illegible] screws .... [illegible] groove in breast beam ..... [illegible] spring which holds on teeth in circumference of temple — [illegible] piece with a circular gutter —

[illegible] clasp, to force the cloth down upon the teeth — by the screw [illegible] — [illegible] whirl to turn with shaft of brush. P. .... [illegible] hub with groove for band. (shown in Fig. 2.) — [illegible] horizontal whirl which —

[illegible] small whirl and spindle .... [illegible] spool (Fig. 3) ..... [illegible] swinging bar .. which has an eye at end .. [illegible] — for the thread to pass through.

[illegible] revolving cam .. to give motion to swinging bar .... [illegible] swiftle [illegible] small whirl on axis of cam .. [illegible]

Patent Office
Aug. 13th 1846.
made under the direction of the Commissioner
of Patents in conformity with the act
of 3rd of March. 1837.
Edmund Burke
Commissioner of Patents Ira Draper, a citizen of Letters Patent.

The Schedule referred to in these Letters Patent and making part of the same, containing a description in the words of the said Ira Draper, himself, of his improvement in Weaving.

The front posts of the frame are no higher than the breast beams to which they are fastened, the sides of the frame are planks having tenons to enter the front posts in a square direction being [illegible] at the other end with tenons to enter the back posts; the back posts are placed oblique (towards) the lay of the back posts & front posts being wide apart; the top end of the back posts being the support of the lay or beater and the lower end being sufficiently oblique, to receive the axis of the yarn beam; from the plank to the back posts a brace is inserted on each side, either straight or curved out, so as to permit the swing of the lay or beater in weaving. The two back posts are united by cross bars, one at the top or as near as the swing of the lay will permit, the other near the bottom, so far below the yarn beam as to give room for the motion of the treadles which are attached to it. The breast beam is formed of three narrow boards; the top board is fastened on the ends of the said posts which support it, the bottom board is inserted at each end into those posts parallel to the top board & about 2½ inches distant from it [a space being between the two sufficient for the movement which impels the shuttle] between the top and bottom boards a narrow board is inserted the whole length; the three being united together, sufficiently firm for a breast beam; the strip of board between is put at the back of the others and must have three mortices through; as will be described in the article describing the throwing the shuttle, the front of the beam will then remain open, for the convenience of in changing the temples as will be seen in the article on that subject.

The

2608X

The claim of originality for the construction of the frame, is not
founded on the difference of <u>shape</u> only. but, the peculiar com-
bination of its parts, so as to withstand the action of the loom
with the greatest advantage; without exterior bracing; it is
likewise founded on the economy of construction, as there are
little more than half the pieces which the frame of other im-
proved looms or the common loom requires. The lay or batten
is made in the common manner, excepting a method of changing the shut-
tle boxes, to place them near together for narrow cloth, or farther apart as
may suit the width of the warp, or the fancy of the weaver; the front side
and end of the shuttle box are fastened together; the end of the shuttle-
box has one end of the shuttle rod secured firmly to it, the other end
of the shuttle rod, is secured by a bended iron screwed on the front of the
lay . The shuttle box is fastened to the lay by a screw through its
end, into the lay; having a nut at the back of the lay to secure
it firm at that end; the other end is fastened by a screw driven
through the side into the bottom of the lay, . on the inside of the
shuttle box is a steel spring, having its elastic point toward the
closed end of the shuttle box and riveted to the side of the shuttle
box; through the side a screw is inserted so as to press upon the
spring & make it project from the side of the box; this spring is to
stop the recoil of the shuttle on striking the end of the shuttle
box; it may be covered with leather or any other substance
suitable for the purpose. There is a groove through the under beam
of the lay through which the picker blocks play (as in other
looms). On the under beam there is also a long wooden spring
made fast by one end, the other end having some play in a staple,
so that when the spring is pressed it will give way with ease
until the staple at the other end stops its elasticity in some degree
and renders its power greater; this spring is of use in throwing the
shuttle as in the following manner. To throw the shuttle; the
motion of the lay as it is thrown back, gives the impelling force
to the shuttle, & the change of the treadles, gives the alternate
direction

2608X direction from side to side; to effect this, on the front of the
breast beam between the top and bottom boards (of which the
breast beam is composed) a crescent or semi circle is pivoted, the
pivot being near the periphery of the semicircle; at the center of the
crescent, on its under side a stick or hand is fastened to project
below the lay or this hand has strings fastened to each of the
picker blocks; by means of the grooves thro' which the picker
blocks slide, in the bottom of the lay; so that the hand being
quickly moved toward the end of the lay would impel the
shuttle in the same direction; to give this hand the requisite
force, a hook is pivoted at corner point of the semicircle; which
hook plays through mortices in the back of the breast beam and
project beneath the lay, so that on catching a hook beneath
the lay and swinging the lay back, it will draw the hook
out, turning the crescent on its pivot & throw the hand in a
contrary direction; then bringing the lay forward and catching
the other hook the operation is reversed and the hand thrown
back to its former position carrying the shuttle to the other
side, To elevate the two hooks successively there are two Levers
on the back of the breast beam (of the first order) these extend to
the front side posts, or so as to clear the edge of the cloth; two other
light Levers (of the second order) having their fulcra at the front
side posts are connected with the former levers (at the end which
clears the cloth) by a string or connecting bar; the light levers are long
enough to play over the treadles of the loom, to which they are
attached by a string that when one treadle is pressed down, it
draws down the light lever and that drawing down the end
of the upper lever, raises that hook which moves through its end.
To prevent an accidental catch of both hooks, a button is secured
on the back board of the breast beam which raising by one hook
bears down the other. The back board of the breast beam has a
long horizontal Mortice at its bottom edge for the movement
of the hand, above this mortice are two other Mortices, wider at top

2608X at top than at bottom in which the two hooks move which are
pivoted into the horns or points of the semicircle or crescent
and catch the spring which is fastened on the bottom of the
lay this spring prevents a jerk or laborious impulse in acting
on the hook to throw the shuttle. To wind the yarn on the yarn
beam regularly & keep it more separate than is commonly done,
the yarn beam is divided into a number of small divisions each
division having a gutter or groove turned in the yarn beam; these
grooves are to receive hoops of iron or tin, which are hinged together
in two or three pieces so as to clasp round the yarn beam again
to constitute thin separations in the warp; at where the hoops unite
a screw holds the circle together, which being taken out, the circle
can be opened and removed from between the bodies of yarn
which it separated; If three hoops are used, the two spaces are
to be filled with warp, the middle hoop is then unhinged and
removed to the next division where it being placed, that space
between the two hoops is filled and the middle hoop removed
to another division; the outside hoop remaining to keep up the yarn
square on the beam. When the warp is as wide as the weaver
desires then the last hoop is left to keep the selvidge yarn regular.
To take the leash with greater certainty of not loosing a thread, I
have devised the following machine. Two narrow pieces of metal
of a sonorous nature (as brass copper sheet iron or tin) are drilled
with holes the size of a common knitting needle & about four times
that distance asunder. These strips of metal are made fast in a
frame horizontal and and parallel to each other and a few inches
distance apart, so that the holes may be over each other, that wires
may play perpendicularly in them. Above these metal pieces & parallel
to them, two wires are stretched, one on each side, wire jacks are then
made by turning the end of a piece of wire to form an eye, for the thread
to pass through, the other end being cut long enough to reach from the [illegible]
wires to a little below the under strip of metal. One of these jacks is put
into each hole; a board is then made by inserting pins, or else cutting out

2608X out [illegible] stakes the distance of every other jack apart, which being pass-
ed beneath the points of the jacks will raise every other one to receive
the yarn of the warp, which is passed thro' from the spools, over the
two side wires, that the eye of the jack will be held suspended, until
the thread breaks; when by the jacks falling on the metal strips,
notice will be given of its failure & the eye readily detect which thread
has broken. The board being then removed to pass beneath the other
half of the jacks, they are raised above the wires and the yarn passed
through them; The two alternate shades are then united into a leach
This leaching machine being placed at the rear of the Loom, the warp
can be wound on the yarn beam without removing it from its
place and the subdivisions of the yarn beam, with the metal hoops
a few spools will be sufficient to warp any width of cloth.
When the warp is wound on the yarn beam it is necessary an equal
quantity should be wound on every part; to ascertain this a tally wheel
is applied at the side of the loom. At the end of the yarn beam a pin is
driven to project a short distance; every revolution of the yarn beam
moves one tooth of a small wheel above, by this pin entering its space;
this wheel has a similar pin projecting some distance from its axis,
which acts in a similar manner on another wheel placed above
that one; If the pin on the axis of the yarn beam, moved a tooth
of the tally wheel once in 3 feet and there were ten teeth in that wheel,
it would of course revolve once in thirty feet or ten yards; this tally
wheel having a similar eccentric pin or tooth to give motion to
another tally wheel would give a tally of 100 yards, each of these
tally wheels should have a spring or pall to hold them firm without
changing until the eccentric pin gives them motion. To wind
up the cloth when it is wove a large roller or truck is turned on the
end of the yarn beam, a smaller one on the end of the cloth beam; each
of these rollers has several grooves for bands, the diameters of the
grooves decreasing on one beam and increasing in the opposite
roller of the other beam; round these rollers a band is put crossing; begin-
ning to weave with the band on the largest roller of the yarn beam
and

2608X and the smallest roller of the cloth beam; the beating of the lay
strains upon the yarn which gives motion to the yarn beam; the turn
on the large roller of the yarn beam & small roller of the cloth beam in-
strains still more upon that, so that the cloth is wound on the
upper side of the cloth beam. should the motion given to the band
be more than what is necessary, to wind up the cloth, the band
will slip round the cloth beam, at the same time keeping the cloth
tight; this band is tightened by a block with a lever to draw it down
as is usual in other machinery: to make the band hold tight on the
yarn beam, when it slips on the cloth beam, a friction roller is placed in the front of
the crossing of the band; having a screw and nut to make it fast on the side of
the loom; this friction roller being pressed tight against the crossed band; will
bind it upon the yarn roller and make it hold firmly on that roller by being
screwed in that position, by the nut on the outside of the frame; this friction
roller may be screwed tight so as not to turn, or it may be left to turn freely.
To size the yarn before it passes through the harness; the yarn roller is in the
usual place, but has a covering of cloth or knit web which will be even and
regular on its surface without a ridgy seam. Under this roller is another roller
covered in a similar manner having a trough underneath to contain
size or paste or any substance with which the yarn is to be sized; one of these
rollers has its centres moveable that by screws they may be borne hard
together; that when the lower roller turns in the paste or size it will, in its revolu-
tion, squeeze a sufficient quantity of it into the yarn roller to size the
yarn. Between the yarn roller and the harness a circular brush
is placed to brush the web and lay the fibres smooth, before they pass
the harness. this brush is turned by the motion of the treadles; on the
end of the shaft of the circular brush are two whirls having grooves in each;
each whirl has a click to catch in teeth on the shaft of the circular brush
round which they are to revolve; over the treadles are two cross shafts
pinioned on one side of the loom, directly under the circular brush and
extending to the other side, to play under the false whirl on the brush's
shaft; a cord is made fast to the end of one of the cross shafts and
with a double turn round, one whirl is fastened to the other cross
shaft shaft, where another cord is fastened and in the same manner passes
round the other whirl in a contrary direction, the end being made
fast to the other rock shaft; these rock shafts are attached to the
treadles by cords one shaft being attached to each treadle; so that
when the rock shaft is pulled down by a treadle it turns one whirl
forward and gives motion to the brush and turns the other whirl
back to take a fresh hold with the click, of the teeth on the shaft.
the axis of the circular brush, projects beyond the outside of the
frame, where it is square, to receive another whirl for quilling or
winding spools which will be more regularly described here-
after. The temples instead of being movable and put above the cloth to
stretch it, as in common looms, are in this loom put under the cloth
& screwed to the breast beam. each temple consists of a circular
ring of metal, having sharp teeth, on the flat of the ring, which
stand angular to its surface and do not take hold when the ring
is turned one way but enter very easily when the ring is turned
the other way these teeth, likewise are angularly bent outward,
from a vertical position. A cap is put over the ring which covers
more than one half of it. this cap is screwed to the bottom, which
has two flat lips with a groove in each lip, for receiving a screw,
that the lips may be screwed firmly on the breast beam and capable
of being easily altered; there is likewise a groove in the breast beam,
parallel to its edges; through which the same screws enter, which hold the
temple, having nuts or thumb screws below which will hold the
temple cases in any place or position which the width of the cloth
or the contraction of its filling may require, on the inside of the case
is a fall spring to hold on teeth on the circumference of the temple and secure
its rotative motion. These temples with the cases are let into the upper
board of the breast beam, so that the cloth may pass over them
even and smooth: the uncovered teeth of the temples are placed
towards the side of the loom; to force the cloth down upon the
teeth a clasp or cover is hinged on a projecting lip or piece which
has a circular gutter under which the teeth of the temple may
turn easily, without being touched; there is also a screw in this

2608X in this lid towards the hinge by which it may be held down.
To use these temples, place them at the distance which your
cloth is to be distended, put the selvedge on the teeth & screw
down the clasps to hold it there; then commence weaving
and as the cloth is made and drawn toward the breast
beam it will pass under the clasps and seize on the oblique
teeth and by compelling the temples to turn, the cloth will be
stretched out; the two temples being made to stretch equal-
ly. on the end of the axis of the circular brush (outside the
frame) is a whirl fastened on the axis to turn with it; this
whirl is about the same size of the false whirl which gives
motion to the brush, on the side of this whirl is a hub having
grooves for a band, one groove being larger than another;
there is another whirl similar to this placed horizontally a
small distance from it. a band is passed round the whirl on the
circular brush and round the hub of the other whirl, to
give a multiplying motion to its whirl; from this whirl a
band is passed round a small whirl and spindle and which is placed
nearly between the two whirls; on the spindle a quill or
spool is put for the filling to be wound on it. To wind the
filling regularly on the quill or spool, it is threaded
through an eye at the end of a swinging bar, which is
suspended above, from a piece attached to the loom;
at a medium distance between the place of suspension
and the eye, a revolving cam is situated whose progressive
turn may bear against the swinging bar and regulate
the motion along the side of the spool. The blades or swifts
on which the yarn is extended are made of four light elastic
arms a little thicker than that which is used for baskets; the
end of each arm is turned downward at right angle to the
shaft and its point bent outward to prevent the yarn from
slipping off; at the crossing of these blades a hub is put, having
a hole through it, to admit a spindle freely; on the top of the
hub hub a piece of metal is fastened that the point of the spin-
dle, may support the swifts; on the under side of the hub
another piece of metal is fastened, having a hole through
for the spindle to enter and keep the arms of the swifts hori-
zontal; the yarn being extended over these swifts by their elas-
ticity and threaded through the eye of the pendulous bar then tied
round the spool is by the afore described operation wound
regularly on the spool, for filling or warp: the cam may be
changeable to suit any method of winding; to wind on a long
spool or a short one; or to wind long over the spool or very close
on the axis of the cam a small wheel is fastened, with various
sized grooves; round this whirl, ~~round this [illegible]~~ a band
is passed and around the hub of the whirl on the axis of
the circular brush, which gives it a slow motion to regulate
the winding of the yarn upon the quill or spool.

Witnesses
John M. Dearborn
Daniel Safford

Ira Draper

Exd. [illegible]

Drawing Made (3850 Words)